(12) United States Patent
Kamizono et al.

(10) Patent No.: US 7,436,315 B2
(45) Date of Patent: Oct. 14, 2008

(54) PASSENGER DETECTION SYSTEM

(75) Inventors: Tsutomu Kamizono, Nagoya (JP); Shinji Ando, Nukata-gun (JP)

(73) Assignees: DENSO CORPORATION, Kariya (JP); Nippon Soken, Inc., Nishio (JP)

( * ) Notice: Subject to any disclaimer, the term of this patent is extended or adjusted under 35 U.S.C. 154(b) by 219 days.

(21) Appl. No.: 11/402,560

(22) Filed: Apr. 12, 2006

(65) Prior Publication Data
US 2006/0231320 A1    Oct. 19, 2006

(30) Foreign Application Priority Data
Apr. 13, 2005  (JP) ............................. 2005-116092

(51) Int. Cl.
*G08B 21/00* (2006.01)

(52) U.S. Cl. ..................... 340/667; 340/666; 340/573.1

(58) Field of Classification Search ................. 340/667, 340/666, 665, 573.1
See application file for complete search history.

(56) References Cited

U.S. PATENT DOCUMENTS

| | | | |
|---|---|---|---|
| 6,283,504 B1 | 9/2001 | Stanley et al. | |
| 6,329,913 B1 | 12/2001 | Shieh et al. | |
| 6,329,914 B1 | 12/2001 | Shieh et al. | |
| 6,348,862 B1 | 2/2002 | McDonnell et al. | |
| 6,378,900 B1 | 4/2002 | Stanley et al. | |
| 6,392,542 B1 | 5/2002 | Stanley | |
| 6,445,294 B1 | 9/2002 | McDonnell et al. | |
| 6,517,106 B1 | 2/2003 | Stanley et al. | |
| 6,520,535 B1 | 2/2003 | Stanley et al. | |
| 6,563,231 B1 | 5/2003 | Stanley et al. | |
| 6,577,023 B1 | 6/2003 | Stanley et al. | |
| 6,598,900 B2 | 7/2003 | Stanley et al. | |
| 6,793,242 B2 * | 9/2004 | Breed et al. ................. | 280/735 |
| 6,825,765 B2 | 11/2004 | Stanley et al. | |
| 7,243,945 B2 * | 7/2007 | Breed et al. ................. | 280/735 |
| 2001/0045733 A1 | 11/2001 | Stanley et al. | |
| 2005/0128082 A1 | 6/2005 | Stanley et al. | |

FOREIGN PATENT DOCUMENTS

| | | |
|---|---|---|
| JP | 11-268607 | 10/1999 |
| JP | 11-271463 | 10/1999 |
| JP | 2002-350250 | 12/2002 |

OTHER PUBLICATIONS

U.S. Appl. No. 11/337,896, filed Jan. 23, 2006, Kamizono.

* cited by examiner

*Primary Examiner*—Daryl C Pope
(74) *Attorney, Agent, or Firm*—Harness, Dickey & Pierce, PLC

(57) ABSTRACT

A passenger detection system for detecting a sitting of a passenger on a seat of a vehicle has a capacitive passenger detection electrode which is embedded in the seat to detect the sitting, a surface unit attached to an upper surface of the seat, a driving unit which applies a voltage between the passenger detection electrode and a vehicle GND, and a detection unit for detecting a capacitance between the passenger detection electrode and the vehicle GND. At least a covering portion of the surface unit is rendered electrically conductive. The passenger detection electrode is covered with the covering portion. Thus, a sitting of the seat can be substantially detected by the passenger detection system.

20 Claims, 3 Drawing Sheets

PASSENGER DETECTION SYSTEM

CROSS REFERENCE TO RELATED APPLICATION

This application is based on a Japanese Patent Application No. 2005-116092 filed on Apr. 13, 2005, the disclosure of which is incorporated herein by reference.

FIELD OF THE INVENTION

The present invention relates to a passenger detection system for detecting a sitting of a passenger on a seat. The passenger detection system has a stable detection performance even when the seat is watered.

BACKGROUND OF THE INVENTION

Generally, a vehicle is provided with a passenger protection device such as an airbag device and a seatbelt device for protecting a passenger in a collision of the vehicle or the like. In this case, for example, an airbag can be deployed in the collision to prevent the passenger sitting on the seat from colliding with an instrument panel of the vehicle and the like. That is, the airbag is to be deployed only in the case where there is a passenger on the seat. In the travel of the vehicle, it is possible that there is no passenger at seats (e.g., assistant seat) other than a driver seat where a driver is seated. Therefore, it is preferable for a passenger (sitting) detection system to be provided for the vehicle so as to actuate the airbag (e.g., airbag for assistant seat) only in the case where there is a passenger on the seat (e.g., assistant seat).

In this case, a capacitive sensor is often used in the passenger detection system, for example, referring to JP-11-271463. As shown in FIG. 8, a first electrode 100 (high-potential electrode) is arranged at an upper surface of an electrical-insulating film member (not shown). A second electrode (low-potential electrode) is constructed of a sitting frame 102 (of seat) which is made of a metal and connected with a vehicle chassis GND 108. There exists a capacitance Co between the first electrode 100 and the sitting frame 102.

A driving unit 104 which is arranged between the vehicle chassis GND 108 and the first electrode 100 applies a high-frequency voltage so that a weak electric field is formed. The lower half portion of the passenger sitting on the seat is positioned in the electric field so that a capacitance Cb of the electric field will vary responding to a sitting and a non-sitting of the seat. Thus, the sitting of the seat is detected by measuring the variation via an ammeter 106.

However, the seat may be watered due to rainwater entering the vehicle through an opened window or door of the vehicle, or drinking water which is spilled, or the like. The above-described passenger detection device has not been provided with measures against the watering of the seat. In this case, water (e.g., rainwater) entering the vehicle may seep into the seat through a surface member thereof, to reach the first electrode 100 (passenger detection electrode). Because the relative permittivity of water is larger than that of air, the gap between the lower half portion of the passenger and the passenger detection electrode will be changed when water reaches the passenger detection electrode, to have a same effect with the case where the area of the passenger detection electrode is enlarged. Thus, the capacitance Cb between the passenger detection electrode and the vehicle chassis GND is changed by water which enters the vehicle, so that it will be determined that there is a sitting on the seat in spite of no-sitting thereon.

Referring to JP-2002-350250A, a pressure-sensitive senor is mounted at the seat, considering the influence of watering of the seat. However, as compared with a capacitive sensor (used in the present invention) where there is a great influence due to entering water, there is not so much influence on the pressure-sensitive senor due to entering water.

SUMMARY OF THE INVENTION

In view of the above-described disadvantage, it is an object of the present invention to provide a passenger detection system which substantially detects a sitting of a passenger on a seat. In the passenger detection system, a misoperation of a passenger detection electrode or the like due to watering of the seat is restricted.

According to a first aspect of the present invention, a passenger detection system for detecting a sitting of a passenger on a seat of a vehicle is provided with a capacitive passenger detection electrode which is embedded in the seat to detect the sitting, a surface unit which is attached to an upper surface of the seat, a driving unit which applies a voltage between the passenger detection electrode and a GND of the vehicle, and a detection unit for detecting a capacitance between the passenger detection electrode and the vehicle GND. At least a covering portion of the surface unit is rendered electrically conductive. The passenger detection electrode is covered with the covering portion.

Thus, the passenger detection system can substantially detect a sitting on the seat. In this case, the covering portion (of surface unit) which covers the passenger detection electrode is rendered electrically conductive. Therefore, the covering portion will become a part of the passenger detection electrode when the seat is watered, thus restricting a misoperation of the passenger detection system.

Preferably, the surface unit has a first conductive member (e.g., conductive-fabric coat member) which is attached to an upper surface of the covering portion, and a second conductive member (e.g., conductive urethane member) which is attached to a whole lower surface of the surface unit.

Thus, the covering portion of the surface unit can be readily substantially provided with the electric conductivity.

More preferably, the passenger detection system further has a capacity reduction electrode for eliminating a capacitance between the passenger detection electrode and a sitting frame of the seat in the case of non-sitting on the seat from the capacitance in the case of the seat having a sitting. The sitting frame and the vehicle GND are electrically continuous. The capacity reduction electrode is opposite the passenger detection electrode.

Because the capacitance in the vacant state of the seat is eliminated, only the capacitance due to the sitting is detected. Thus, the sitting of the seat can be properly detected by the passenger detection system.

According to a second aspect of the present invention, a passenger detection system for detecting a sitting of a passenger on a seat of a vehicle is provided with a capacitive passenger detection electrode which is embedded in the seat to detect the sitting, a surface unit which is attached to an upper surface of the seat, a driving unit which applies a voltage between the passenger detection electrode and a GND of the vehicle, and a detection unit for detecting a capacitance between the passenger detection electrode and the vehicle GND. At least a covering portion of the surface unit is rendered water-repellent. The passenger detection electrode is covered with the covering portion.

Thus, the passenger detection system can substantially detect a sitting on the seat. Because the covering portion of the surface unit which covers the passenger detection electrode is provided with the water-repellent process, water can be restricted from reaching the passenger detection electrode even when the seat is watered. Thus, the misoperation can be restricted.

Preferably, the covering portion of the surface unit is provided with one of Teflon which is applied to the covering portion, and vinyl of which the covering portion is made.

Thus, the covering portion of the surface unit can be readily substantially rendered water-repellent.

According to a third aspect of the present invention, a passenger detection system for detecting a sitting of a passenger on a seat of a vehicle is provided with a capacitive passenger detection electrode which is embedded in the seat to detect the sitting, a driving unit which applies a voltage between the passenger detection electrode and a GND of the vehicle, and a detection unit for detecting a capacitance between the passenger detection electrode and the vehicle GND. The seat defines therein at least one drain hole which has an opening at an upper surface of the seat and deviates from the passenger detection electrode when being viewed in a plan view of the seat.

Thus, the passenger detection system can substantially detect a sitting on the seat. Because the seat is provided with the drain hole which has the opening at the upper surface of the seat, water can be restricted from reaching the passenger detection electrode even when the seat is watered. Thus, the misoperation can be reduced.

Preferably, the drain hole extends to a lower surface of the seat.

Thus, water at the upper surface of the surface member can be substantially drained to the lower side (or flank side thereof) of the seat.

BRIEF DESCRIPTION OF THE DRAWINGS

Other objects, features and advantages of the present invention will become more apparent from the following detailed description made with reference to the accompanying drawings, in which.

DETAILED DESCRIPTION OF THE EXAMPLE EMBODIMENTS

First Embodiment

A passenger detection system 55 according to a first embodiment of the present invention will be described with reference to FIGS. 1-5. The passenger detection system 55 can be suitably used for a vehicle, for example.

Figure 1:
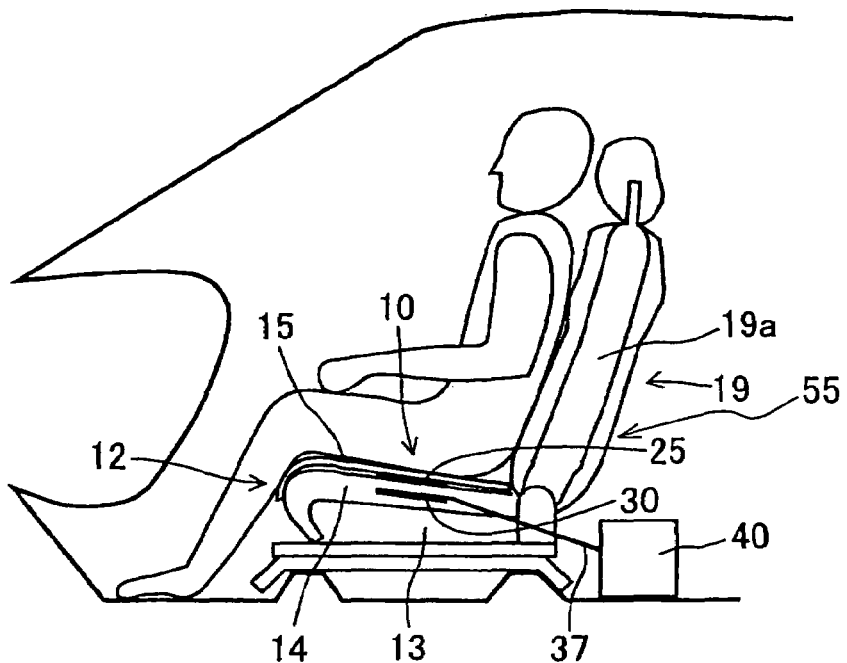
FIG. 1 is a schematic view showing a whole construction of a passenger detection system according to a first embodiment of the present invention.

As shown in FIG. 1, a seat 10 (e.g., assistant seat) of the vehicle is constructed of a sitting portion 12 and a backing portion 19. The sitting portion 12 is fixed to a vehicle chassis. The backing portion 19 is rotatably supported by the sitting portion 12, with respect to the part (of backing portion 19) adjacent to the sitting portion 12.

The sitting portion 12 includes a sitting frame 13, a cushion member 14 and a surface unit 15. The sitting frame 13 is made of a metal or the like to construct a framework of the sitting portion 12. The cushion member 14 made of a foam resin or the like is attached to the sitting frame 13. The surface unit 15, being made of a cloth, a leather or the like, covers the upper surface of the cushion member 14.

An electrode unit 20 having a substantial sheet shape is mounted between the surface unit 15 and the cushion member 14. The backing portion 19 has a backing frame 19a which constructs a framework thereof. In this case, the upper surface of the surface unit 15 can be provided with a water-repellent process.

Figure 2:
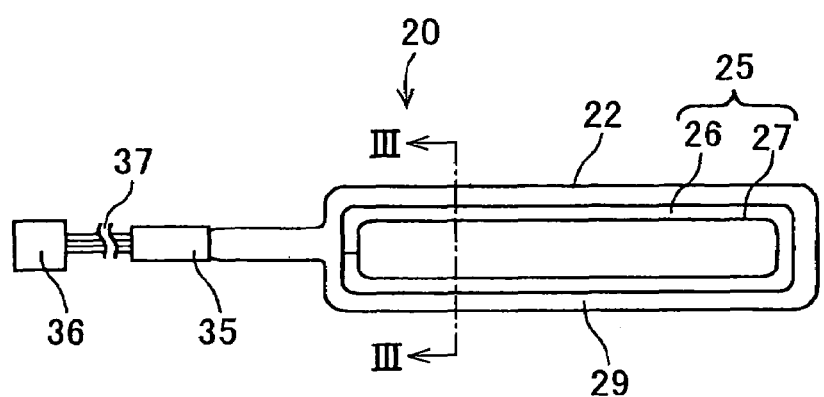
FIG. 2 is a plan view showing an electrode unit having a passenger detection electrode and a capacity reduction electrode according to the first embodiment.
Figure 3:
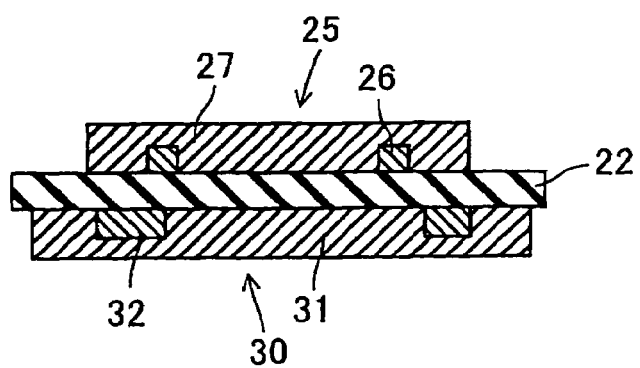
FIG. 3 is a vertical sectional view taken along a line III-III in FIG. 2.

As shown in FIGS. 2 and 3, the electrode unit 20 has a film member 22, a passenger detection electrode 25, a capacity reduction electrode 30, a shielded wire 37 and the like. For the purpose of illustration, in FIG. 3, the film member 22, the passenger detection electrode 25 and the capacity reduction electrode 30 are exaggerated in the vehicle up-down direction.

The film member 22 is made of, for example, PET (polyethylene terephthalate) which is an electric-insulating material. The film member 22 can have a substantial rectangular shape, for example. The passenger detection electrode 25 (e.g., capacitive passenger detection electrode) is embedded in the upper portion of the seat 10 (e.g., assistant seat) of the vehicle to detect a sitting of a passenger thereon. The passenger detection electrode 25 is arranged at a substantial center portion of the upper surface of the film member 22, and has a carbon electrode portion 26 and a silver electrode portion 27. Each of the carbon electrode portion 26 and the silver electrode portion 27 has a substantially rectangular sash shape.

The capacity reduction electrode 30 is opposite the passenger detection electrode 25. The capacity reduction electrode 30 has a carbon electrode 31 and a silver electrode portion 32 which are positioned at the lower side of the film member 22. Each of the carbon electrode 31 and the silver electrode portion 32 has a substantially rectangular sash shape.

Figure 4:
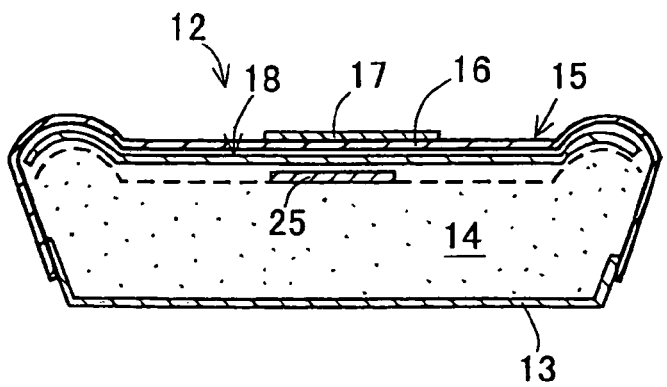
FIG. 4 is an enlarged cross-sectional view showing a surface unit of a sitting portion and a vicinity thereof according to the first embodiment.

Referring to FIG. 4, a first conductive member 17, being made of a conductive (electrically conductive) material, is coated to an upper surface of a center portion 16 (covering portion) of the surface unit 15. The first conductive member 17 can be made of a conductive fabric, so that conductivity can be provided to the covering portion 16 and an appearance of the first conductive member 17 can be harmonized with the surface unit 15 in the case where the surface unit 15 is made of a fabric.

The center portion 16 of the surface unit 15 is positioned at the upper side of the passenger detection electrode 25. The conductive-fabric coat member 17 (first conductive member) has, for example, a substantially rectangular shape to sufficiently cover the passenger detection electrode 25.

A second conductive member 18, being electrically conductive, is arranged between a lower surface of the surface unit 15 and the electrode unit 20 (passenger detection electrode 25). The second conductive member 18 can be constructed of, for example, a conductive urethane, and has a substantially same size with the surface unit 15. That is, the second conductive member 18 is attached to the whole lower surface of the surface unit 15.

The attachment of the conductive urethane member 18 (second conductive member) to the whole lower surface of the surface unit 15 is, to ensure that the conductive-fabric coat member 17 has same operation with the passenger detection electrode 25 when water enters the part between the passenger detection electrode 25 and the conductive-fabric coat member 17.

An external connection connector 36 and a shielded-wire connection connector 35 are arranged at the back side of the seat 10. The passenger detection electrode 25 and the capacity reduction electrode 30 are connected with the shielded-wire connection connector 35 through a communication hole (not shown) which penetrates the cushion member 14 of the seat 10. The external connection connector 36 and the shielded-wire connection connector 35 are connected with each other via the shielded wire 37.

A passenger detection ECU 40 is connected with the external connection connector 36. The passenger detection ECU 40, being arranged at a vehicle floor or the like, is connected with the electrode unit 20 through the shielded wire 37. The passenger detection ECU 40 is provided with a CPU and a communication interface. The CPU has a current detection circuit 50, a driving circuit 45 and an A/D converter (not shown). In this case, the driving circuit 45 applies a voltage between the passenger detection electrode 25 and a vehicle GND 42.

According to this embodiment, the passenger detection system 55 includes the surface unit 15 of the seat 10, the passenger detection electrode 25, the capacity reduction electrode 30, the driving circuit 45 (driving unit) and the current detection circuit 50 (detection unit).

Figure 5:
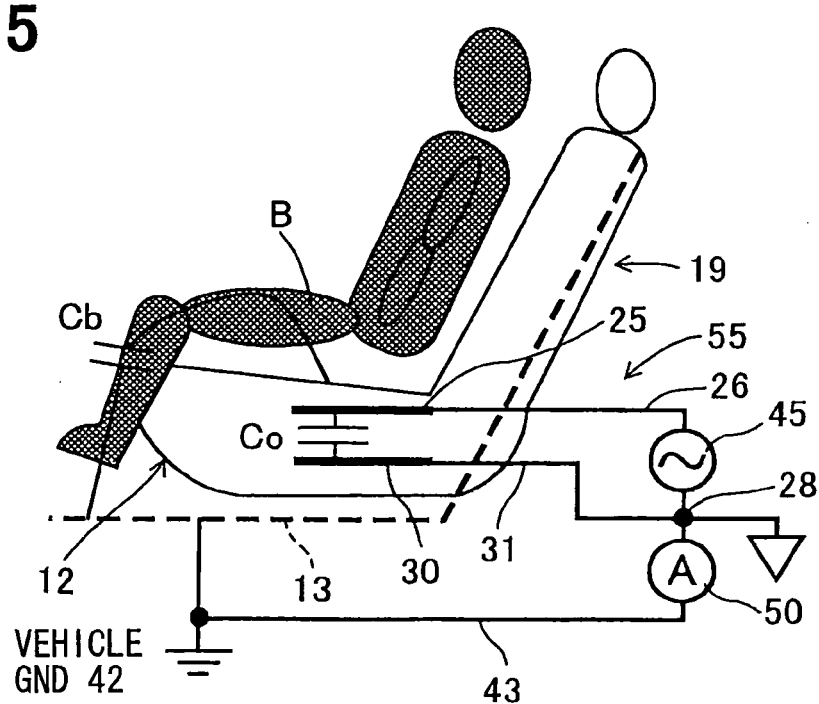
FIG. 5 is a schematic view showing a circuit of the passenger detection system according to the first embodiment.

As shown in FIG. 5, a wiring 26, a wiring 31 and a wiring 43 are connected with each other at a connection point 28. The driving circuit 45 is arranged at the wiring 26, which extends from the passenger detection electrode 25. The wiring 31 extends from the capacity reduction electrode 30. The current detection circuit 50 (e.g., ammeter) is arranged at the wiring 43 which extends from the vehicle GND 42. That is, the driving circuit 45 is arranged between the passenger detection electrode 25 and the capacity reduction electrode 30, and the current detection circuit 50 is arranged between the capacity reduction electrode 30 and the vehicle GND 42.

Next, the function of the passenger detection system 55 according to this embodiment will be described.

Referring to FIG. 5, as described above, the driving unit 45 applies the voltage between the passenger detection electrode 25 and the vehicle GND 42. When a low voltage having a high frequency is supplied for the driving circuit 45, the passenger detection electrode 25 is driven to a high potential, that is, an output side of the driving circuit 45, and the vehicle body GND 42 and the capacity reduction electrode 30 are driven to a low potential, that is, an input side of the current detection circuit 50.

That is, in this case, the passenger detection electrode 25 and the capacity reduction electrode 30 are respectively provided with the high potential and the low potential. Alternatively, the passenger detection electrode 25 and the capacity reduction potential 30 can be also respectively provided with a low potential and a high potential. Here, the high potential means the output side of the driving circuit 45 and the low potential means the input side of the current detection circuit 50.

Referring to FIG. 5, in the case where there is a sitting of a passenger on the seat 10, a lower half portion B of the passenger is seated on the surface unit 15 to intervene between the passenger detection electrode 25 and the sitting frame 13 which is connected with the vehicle chassis. A capacitance Cb occurs among the passenger detection electrode 25, the lower half portion B and the vehicle GND 42. The current flowing between the vehicle GND 42 and the passenger detection electrode 25 is detected via the current detection circuit 50.

Because the capacity reduction electrode 30 is driven to have a potential (low potential) same with that of the vehicle GND 42 by the driving circuit 45, a capacitance does not exist between the vehicle body DND 42 and the capacity reduction electrode 30. In this case, a capacitance Co exists between the passenger detection electrode 25 and the capacity reduction electrode 30. The capacitance Co is not detected by the current detection circuit 50.

The detection circuit 50 (current detection circuit) detects the capacitance between the passenger detection electrode 25 and the vehicle GND 42. According to this embodiment, the capacity reduction electrode 30 and the vehicle GND 42 are provided with the same potential. Therefore, the capacitance between the capacity reduction electrode 30 and the vehicle GND 42 is not detected.

The capacity reduction electrode 30 can be arranged to face the passenger detection electrode 25, and has a substantially same shape with the passenger detection electrode 25. The capacity reduction electrode 30 is provided to eliminate the capacitance between the passenger detection electrode 25 and the vehicle GND 42 in the case of non-sitting on the seat 10, from that in the case of the seat 10 having a sitting.

According to this embodiment, the conductive-fabric coat member 17 is attached to the upper surface of the center portion 16 of the surface unit 15, and the conductive urethane member 18 is attached to the whole lower surface of the surface unit 15. Thus, the center portion 16 which is positioned at the upper side of the passenger detection electrode 25 is provided with the conductivity, to become a part of the passenger detection electrode 25. Therefore, even when water (e.g., which is spilled to sitting portion 12 by passenger on seat 10) reaches the conductive-fabric coat member 17 and the conductive urethane member 18, a permittivity and a distance between the lower half portion B of the passenger and the passenger detection electrode 25 do not substantially vary. Therefore, the capacitance of a condenser between the lower half portion B of the passenger and the passenger detection electrode 25 does not vary too.

According to this embodiment, the passenger detection system 55 can substantially detect the sitting on the seat 10 (e.g., assistant seat) via the passenger detection electrode 25 of the electrode unit 20, the driving unit 50 and the detection unit 45 of the passenger detection ECU 40, and the like. Moreover, because the vacant (non-sitting) capacity Co is eliminated from the capacitance Cb of sitting, the sitting of the passenger can be properly detected based on the capacitance Cb existing among the passenger detection electrode 25, the lower half portion B and the sitting frame 13 which is electrically conducted with the vehicle GND 42. In this case, because the electrode unit 20 has the substantial sheet shape, the passenger detection electrode 25 and the capacity reduction electrode 30 can be readily formed respectively at the upper surface and the lower surface of the film member 22.

Furthermore, because the conductive-fabric coat member 17 and the conductive urethane member 18 which are respectively attached to the upper surface of the center portion 16 of the surface unit 15 and the lower surface of the surface unit 15 practically function as a part of the passenger detection electrode 25, the permittivity and the distance between the lower half portion B of the passenger and the passenger detection electrode 25 will not vary due to entering water. Accordingly, the sitting of the passenger can be properly detected via the passenger detection electrode 25 and the like even when the sitting portion 12 is watered.

According to the first embodiment, at least the center portion 16 (i.e., covering portion) of the surface unit 15 which covers the passenger detection electrode 25 is rendered electrically conductive. For this sake, the conductive-fabric coat member 17 is attached to the upper surface of the covering portion 16, the conductive urethane member 18 is attached to the whole lower surface of the surface unit 15. Alternatively, an electric-conductive material (e.g., electric-conductive threads or cables) can be also sewed in the covering portion 16 to replace the conductive-fabric coat member 17. The covering portion 16 which is rendered electrically conductive, substantially constructs a part of the passenger detection electrode 25.

According to this embodiment, the conductive-fabric coat member 17 which is attached to the upper surface of the surface unit 15 not only provides the electric conductivity, but also improves the appearance of the surface unit 15 of the seat 10 when the surface unit 15 is made of a fabric.

Moreover, the conductive urethane member 18 is attached to the whole lower surface of the surface unit 15 and arranged between the passenger detection electrode 25 and the conductive-fabric coat member 17, so that the conductive-fabric coat member 17 can function same with the passenger detection electrode 25.

Second Embodiment

Figure 6:
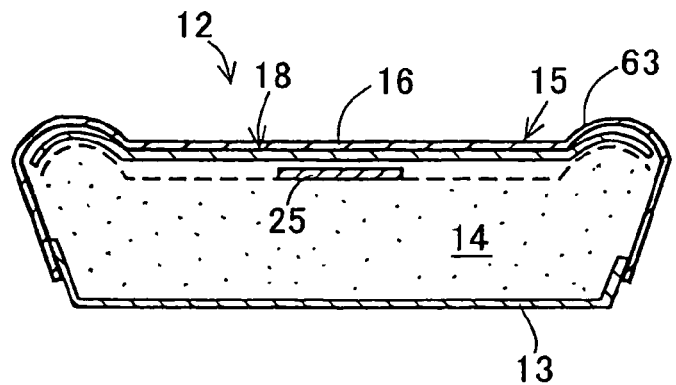
FIG. 6 is an enlarged cross-sectional view showing a main part of a passenger detection system according to a second embodiment of the present invention.

According to a second embodiment (as first modification of above-described first embodiment) of the present invention, referring to FIG. 6, the surface unit 15 of the sitting portion 12 is rendered water-repellent at least at the center portion 16 (covering portion) thereof which covers the passenger detection electrode 25. The conductive-fabric coat member 17 in the first embodiment is not provided in the second embodiment.

Specifically, the water-repellent process can be provided, by coating Teflon or the like to the upper surface of the covering portion 16 positioned at the upper side of the passenger detection electrode 25. The conductive urethane member 18 is attached to the whole lower surface of the surface unit 15.

According to the second embodiment, even when the sitting portion 12 is watered, water will be shed by the surface unit 15 (which is provided with water-repellent process at least at covering portion 16) to be accumulated in a concave portion 63 of the sitting portion 12. Therefore, water can be prevented from seeping in the surface unit 15 to reach the passenger detection electrode 25. Thus, the misoperation of the passenger detection electrode 25 can be restricted.

According to the second embodiment of the present invention, at least the part (covering portion 16) of the surface unit 15 which covers the passenger detection electrode 25 is provided with the water-repellent process. Specifically, Teflon or the like is coated to the covering portion 16. Alternatively, the covering portion 16 can be also made of vinyl or the like. Thus, water can be shed by the covering portion 16, to be restricted from reaching the passenger detection electrode 25.

What has not been described about the passenger detection system 55 in the second embodiment is the same with the first embodiment.

Third Embodiment

Figure 7:
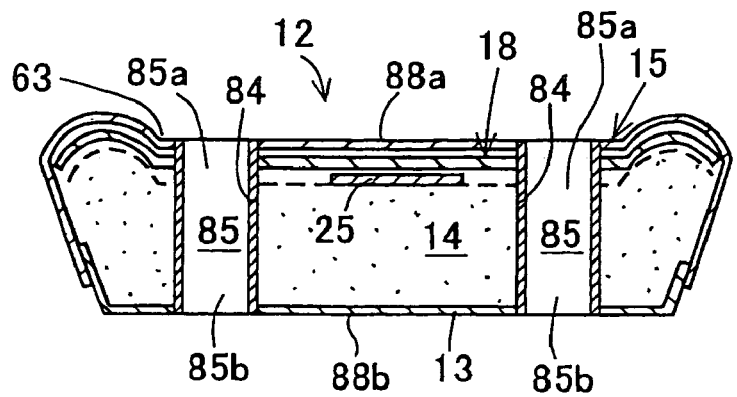
FIG. 7 is an enlarged cross-sectional view showing a main part of a passenger detection system according to a third embodiment of the present invention.
Figure 8:
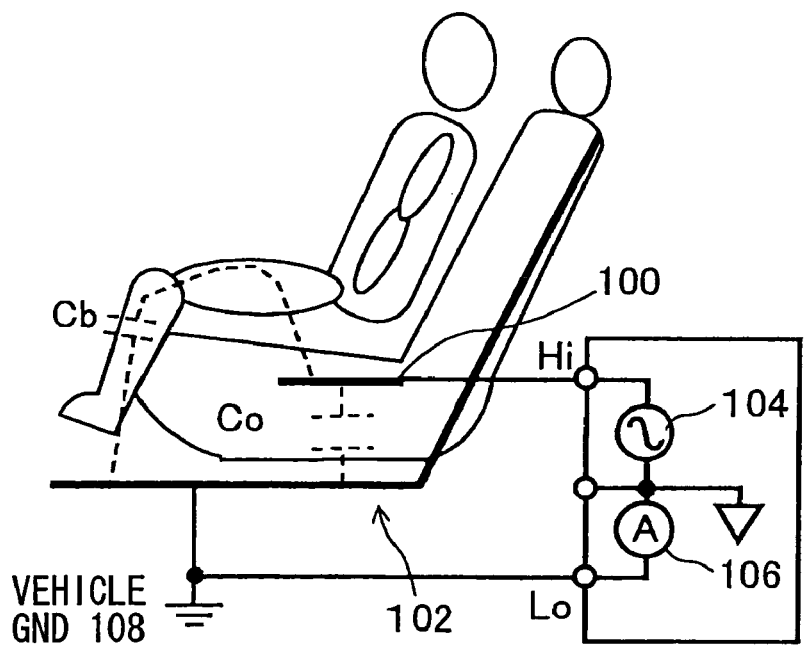
FIG. 8 is a schematic view showing a circuit of a passenger detection system according to a prior art.

According to a third embodiment (as second modification of first embodiment) of the present invention, referring to FIG. 7, the sitting portion 12 is provided therein with at least one drain hole 85, which can be defined by a pipe 84 inserted through the sitting portion 12. The conductive-fabric coat member 17 in the first embodiment is not provided in the passenger detection system 55 in the second embodiment.

The pipe 84 can extend in the vehicle up-down direction (i.e., vertical direction), for example. The pipe 84 penetrates the surface unit 15, the conductive urethane member 18, the cushion member 14 and the sitting frame 13, and deviates from the passenger detection electrode 25 when being viewed in the plan view of the seat 10. That is, the pipe 84 is spaced from the passenger detection electrode 25.

The pipe 84 defines therein the drain hole 85, which has an upper end 85a opening at the upper surface 88a of the sitting portion 12. Moreover, for example, a lower end 85b of the drain hole 85 opening at a lower surface 88b of the sitting portion 12.

According to the third embodiment, even when the sitting portion 12 is watered, water can be drained to the lower side or the like of the sitting portion 12 through the drain hole 85 without being accumulated in the concave portion 63. Therefore, water can be restricted from soaking the surface unit 15 to reach the passenger detection electrode 25. Accordingly, the misoperation of the passenger detection electrode 25 can be reduced.

In this case, at least one the drain hole 85 is provided for the seat 10 and deviates from the passenger detection electrode 25 when being viewed in the plan view of the seat 10. The one axial end 85a (upper end) and the other axial end 85b (lower end) of the drain hole 85 respectively open at the upper surface 88a and the lower surface 88b of the sitting portion 12. Alternatively, the drain hole 85 which has the one axial end 85a opening at the upper surface 88a of the sitting portion 12 can be also provided with the other axial end which opens at a flank surface of the sitting portion 12, so that water at the upper surface 88a of the sitting portion 12 can be drained from the flank side of the seat 10. Thus, water can be restricted from reaching the passenger detection electrode 25.

What has not been described about the passenger detection system 55 in the third embodiment is the same with the first embodiment.

What is claimed is:

1. A passenger detection system for detecting a sitting of a passenger on a seat of a vehicle, the passenger detection system comprising:
    a capacitive passenger detection electrode which is embedded in the seat to detect the sitting;
    a surface unit which is attached to an upper exterior surface of the seat, at least a covering portion of the surface unit being rendered electrically conductive,
    the passenger detection electrode being covered with the covering portion;
    a driving unit which applies a voltage between the passenger detection electrode and a GND of the vehicle; and
    a detection unit for detecting a capacitance between the passenger detection electrode and the vehicle GND.

2. The passenger detection system according to claim 1, wherein
    the surface unit has a first conductive member and a second conductive member, which are electrically conductive and respectively attached to an upper surface of the covering portion and a whole lower surface of the surface unit.

3. The passenger detection system according to claim 2, further comprising
    a capacity reduction electrode for eliminating a capacitance between the passenger detection electrode and a sitting frame of the seat in the case of non-sitting on the seat from the capacitance in the case of the seat having a sitting, the sitting frame and the vehicle GND being electrically continuous, the capacity reduction electrode being opposite the passenger detection electrode.

4. The passenger detection system according to claim 2, wherein the first conductive member is made of conductive fabric, and the second conductive member is constructed of conductive urethane.

5. The passenger detection system according to claim 1, wherein the surface unit has a first conductive member and a second conductive member which are electrically conductive, the first conductive member being sewed in the covering portion, the second conductive member being attached to a whole lower surface of the surface unit.

6. The passenger detection system according to claim 5, wherein the first conductive member is conductive thread, and the second conductive member is constructed of conductive urethane.

7. The passenger detection system according to claim 1, wherein the surface unit is directly attached to the upper exterior surface of the seat.

8. The passenger detection system according to claim 1, wherein the seat comprises a cushion member, the capacitive passenger detection electrode being imbedded in the cushion member, the surface unit covering the cushion member.

9. A passenger detection system for detecting a sitting of a passenger on a seat of a vehicle, the passenger detection system comprising:

a capacitive passenger detection electrode which is embedded in the seat to detect the sitting;

a surface unit which is attached to an upper exterior surface of the seat, at least a covering portion of the surface unit being rendered water-repellent, the passenger detection electrode being covered with the covering portion;

a driving unit which applies a voltage between the passenger detection electrode and a GND of the vehicle; and a detection unit for detecting a capacitance between the passenger detection electrode and the vehicle GND.

10. The passenger detection system according to claim 9, wherein the covering portion of the surface unit is provided with one of Teflon which is applied to the covering portion, and vinyl of which the covering portion is made.

11. The passenger detection system according to claim 10, further comprising a capacity reduction electrode for eliminating a capacitance between the passenger detection electrode and a sitting frame of the seat in the case of non-sitting on the seat from the capacitance in the case of the seat having a sitting, the sitting frame and the vehicle GND being electrically continuous, the capacity reduction electrode being opposite the passenger detection electrode.

12. The passenger detection system according to claim 9, wherein the surface unit is directly attached to the upper exterior surface of the seat.

13. The passenger detection system according to claim 9, wherein the seat comprises a cushion member, the capacitive passenger detection electrode being imbedded in the cushion member, the surface unit covering the cushion member.

14. A passenger detection system for detecting a sitting of a passenger on a seat of a vehicle, the passenger detection system comprising:

a capacitive passenger detection electrode which is embedded in the seat to detect the sitting;

a driving unit which applies a voltage between the passenger detection electrode and a GND of the vehicle; and a detection unit for detecting a capacitance between the passenger detection electrode and the vehicle GND, wherein the seat defines therein at least one drain hole which has an opening at an upper surface of the seat and deviates from the passenger detection electrode when being viewed in a plan view of the seat.

15. The passenger detection system according to claim 14, wherein the drain hole extends to a lower surface of the seat.

16. The passenger detection system according to claim 15, further comprising a capacity reduction electrode for eliminating a capacitance between the passenger detection electrode and sitting frame of the seat in the case of non-sitting on the seat from the capacitance in the case of the seat having a sitting, the sitting frame and the vehicle GND being electrically continuous, the capacity reduction electrode being opposite the passenger detection electrode.

17. The passenger detection system according to claim 14, wherein the drain hole extends to a flank surface of the seat.

18. The passenger detection system according to claim 14, wherein the upper surface of the seat is an upper exterior surface of the seat.

19. The passenger detection system according to claim 14, wherein the at least one drain hole extends entirely through the seat.

20. The passenger detection system according to claim 14, wherein the seat comprises a cushion member, the capacitive passenger detection electrode being imbedded in the cushion member, the surface unit covering the cushion member.

* * * * *